May 30, 1961 J. M. RAKUS 2,986,374
ROTARY PLUG VALVE
Filed May 5, 1959 3 Sheets-Sheet 1

INVENTOR.
JOZEF M. RAKUS
BY Harmon, Pierce & Kurz
ATTORNEYS

May 30, 1961

J. M. RAKUS 2,986,374

ROTARY PLUG VALVE

Filed May 5, 1959

INVENTOR.
JOZEF M. RAKUS
BY Harmon, Pierce & Kurz
ATTORNEYS

INVENTOR.
JOZEF M. RAKUS
BY *Harmon, Pierce & Kurz*
ATTORNEYS

United States Patent Office 2,986,374
Patented May 30, 1961

2,986,374
ROTARY PLUG VALVE
Jozef M. Rakus, 729 Arlington Ave., Plainfield, N.J.
Filed May 5, 1959, Ser. No. 811,076
9 Claims. (Cl. 251—317)

This invention relates to improvements in rotary pipeline valves generally, and more particularly to a corrosion-resistant, self-lubricating valve assembly for high pressure pipeline systems which includes novel structure for resiliently suspending the valve body in floating relationship to the inner walls of the valve chamber.

In the past, valve assemblies incorporating a rotary flow controlling shut-off member have proved incapable of withstanding the widely varying conditions of pressure and temperature existing in many high pressure fluid systems. The thrust of the line pressure on the rotary valve plug of these assemblies tends to cause a deflection of the axis of the plug member from its normal axis of rotation. This misalignment of the valve plug within the valve chamber makes operation of the valve difficult and often results in subsequent jamming or permanent valve damage.

The necessity of providing a fluid seal between the inner walls of the valve chamber and the walls of the rotary valve plug often prevents the effective use of rotary valve assemblies in high pressure fluid systems, as the impingement of fluid and foreign matter against the surfaces of the valve plug cause corrosion and seal wear. In many cases the valve position within the fluid system makes frequent lubrication and maintenance impractical, and this lack of lubrication and maintenance has contributed to the rapid deterioration of prior rotary valves.

It is an object of the present invention to provide an economic and durable quarter turn rotary plug valve for high or low pressure fluid systems which will insure a completely leakproof operation.

Another object of this invention is to provide a corrosion resistant valve of the rotary plug type which is adaptable for use with a wide variety of fluid systems and which requires no lubrication or maintenance.

A further object of this invention is to provide a valve of the rotary plug type wherein the valve plug is resiliently suspended within the valve chamber so as to float free of distortional effects and provide a smooth wear free operation under varying conditions of temperature and pressure.

A still further object of this invention is to provide a pipeline valve of the rotary plug type wherein the valve plug, when moved to a full open position, is always axially aligned within the valve chamber to facilitate unobstructed fluid flow in either direction through the valve or to provide complete freedom of movement for line cleaning devices.

With the foregoing and other objects in view, the invention resides in the following specification and appended claims, certain embodiments and details of construction of which are illustrated in the accompanying drawings in which:

Figure 1:
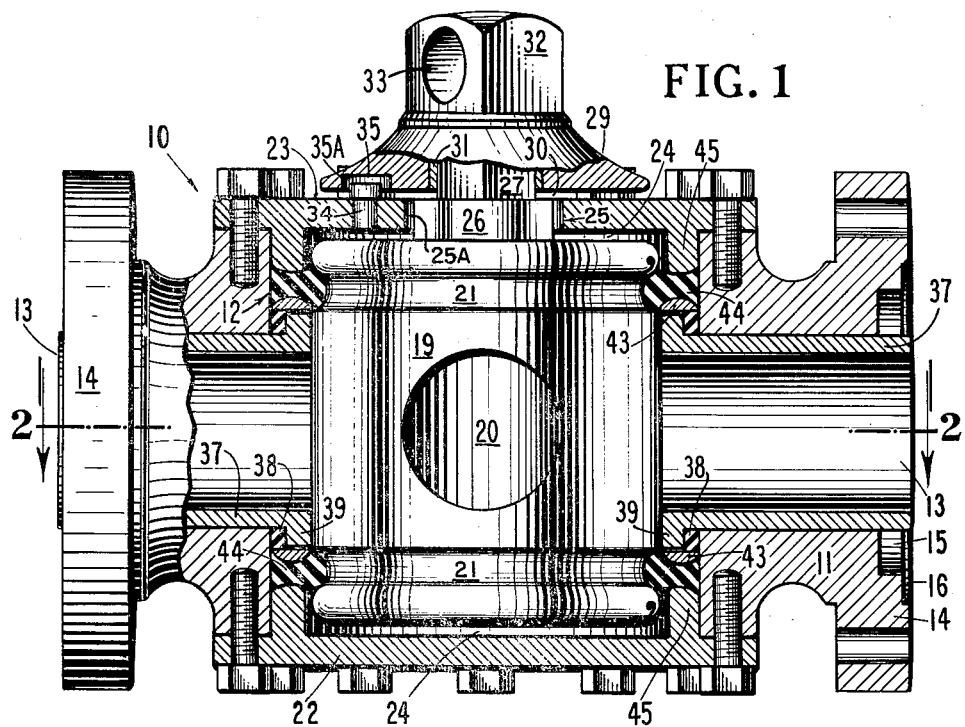
Figure 1 is a partially sectioned view in front elevation of the valve comprising the invention showing the plug in the closed position.
Figure 2:
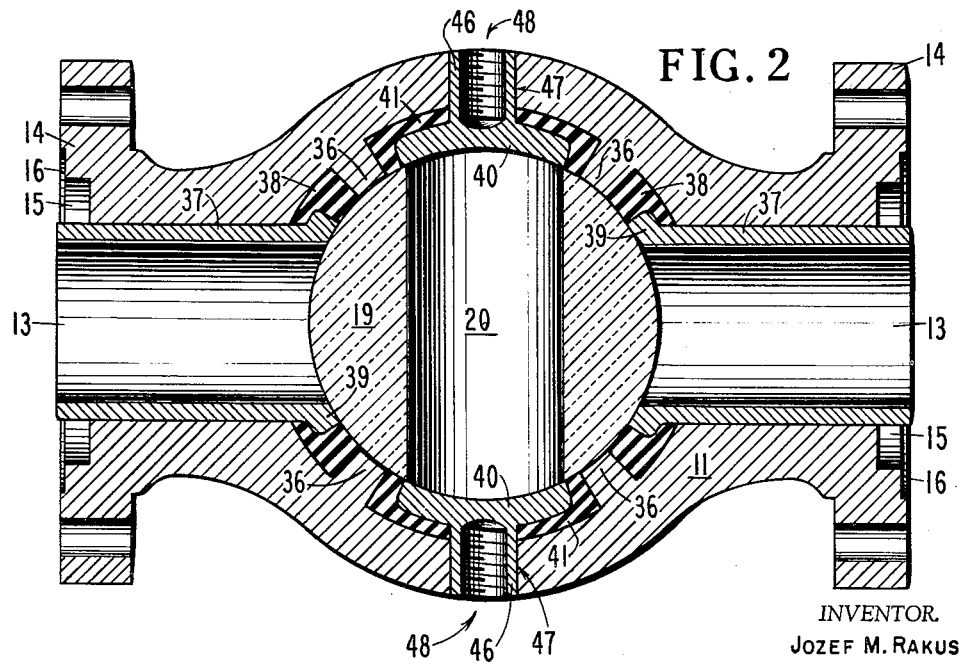
Figure 2 is a sectioned plan view of the valve taken on line 2—2 of Figure 1.
Figure 3:
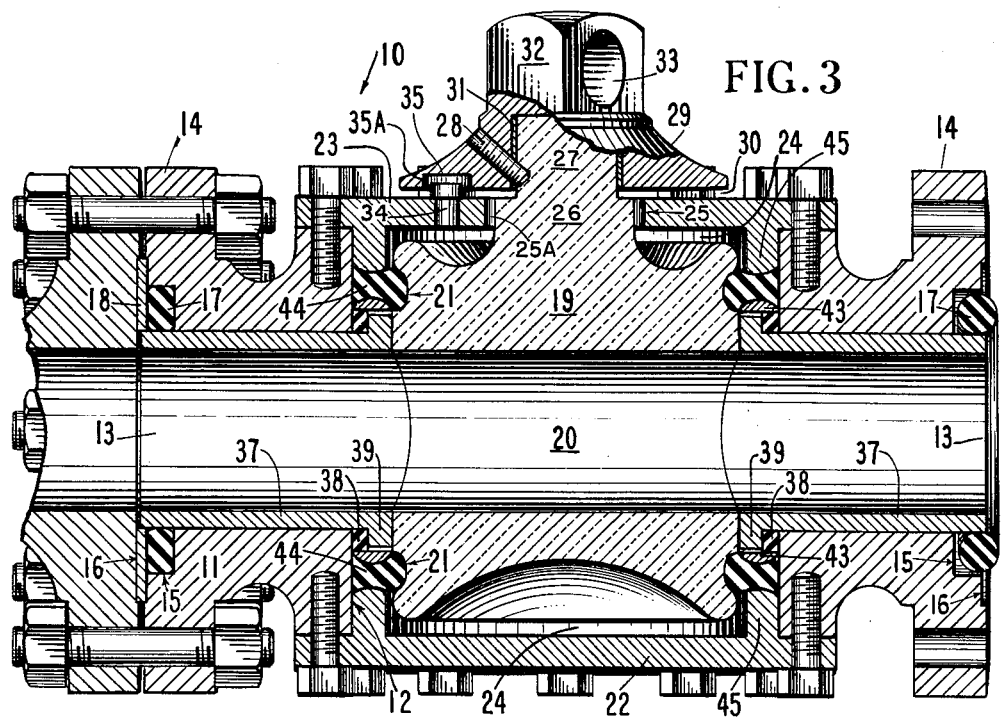
Figure 3 is a sectioned view in front elevation of the valve showing the plug in the fully opened position and one of the valve parts coupled to a pipeline.

Referring to Figures 1 to 3, the valve assembly indicated generally at 10 comprises a forged or molded body 11 provided with a cylindrical valve chamber 12 and diametrically opposed inlet and outlet ports 13. At the outermost extremities of ports 13, suitable flanges 14 are provided for coupling the valve assembly to a fluid line system. The flanges 14 carry grooves 15 and 16 in which seal rings 17 and gaskets 18 are seated (Figure 3).

Positioned within cylindrical valve chamber 12 is a rotatable valve closure plug 19 composed of a non-metallic material such as heat resistant glass. Running through the plug 19 and transversely of the axis of the plug is a central passage 20, the outlets of which align with the inlet and outlet ports of the valve body when the plug is in the open position. In the upper and lower portions of valve plug 19 are two laterally extending annular suspension channels 21 which receive a resilient plug suspension structure to be described later.

Removably coupled to valve body 11 above and below the valve plug 19 are a base plate 22 and a bonnet 23. The base plate and bonnet are constructed of weatherproof corrosion resistant material and are spaced from valve plug 19 to provide a clearance 24. Disposed vertically through the central portion of the bonnet is an opening 25 which receives a circular neck 26 formed on the top of valve plug 19. Opening 25 is of a diameter greater than that of neck 26 so that a clearance 25A is formed between the neck 26 and the bonnet 23. The valve plug is rotatable within the valve chamber 12 by means of a rectangular stem 27 which extends above the bonnet from the circular neck 26. Secured to stem 27 by means of a set screw 28 is a weatherproof cap 29, said cap being spaced above the bonnet to provide a clearance 30 which is equal to clearance 24 between the valve plug and base plate. A suitable gasket member 31 of leather or other material is provided between the stem and the cap. Cap 29 is provided with a central upwardly extending rectangular crest 32 suitable for wrench actuation and extending horizontally through crest 32 is a circular opening 33 which provides an opening for rod actuation. Cap 29 may be formed or provided with any other desired means for manual or power actuation.

Means for limiting the rotation of the valve plug to a quarter turn may be in any form desired. As here illustrated, a flatheaded pin or rivet 34 and groove or slot 35 are provided, the pin being inserted in the upper face of the bonnet and the slot being formed in the lower face of discular cap 29. Groove 35 is formed of sufficient size so as to provide a clearance 35A between the top sides of pin 34 and the surfaces of the groove. The clearances 25A, 30 and 35A are of such a size that the valve plug and members carried thereby are prevented from contacting the bonnet or pin regardless of the magnitude of the pressure exerted on the valve plug. Indication marks (not shown) for the closed and open positions of the valve or for any fraction of closure thereof may be impressed upon the bottom edge of cap 29 and the top of bonnet 23, or they may be provided in any other desired manner.

Figures 6, 7:
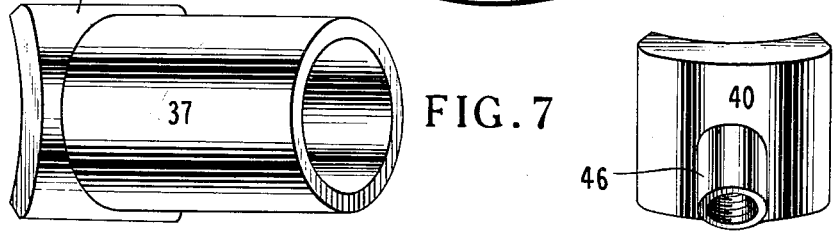
Figures 6 and 7 are detailed perspective views of the valve insert retaining members.
Figure 8:
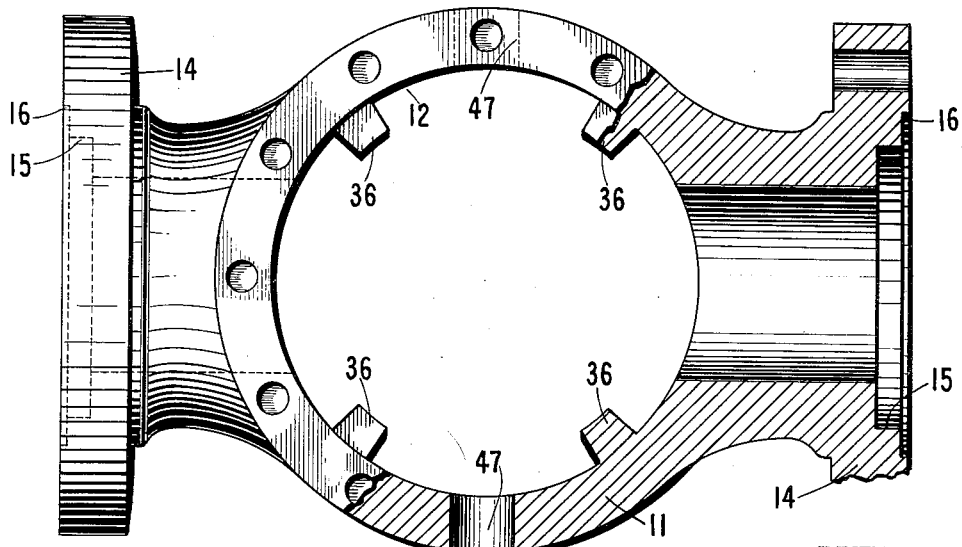
Figure 8 is a partially sectioned plan view of the valve body.

Extending from the walls of cylindrical valve chamber 12 are four equally disposed axially aligned vertical ribs 36 (Figure 8) which in cooperation with the two tubular liner members 37 closely confine resilient inserts 38 against the walls of valve chamber 12. Tubular liners 37 are received within the valve inlet and outlet ports 13 and are provided with axially aligned flanges 39 at their inner valve ends (Figure 7). Intermediate ribs 36 on opposite sides of valve plug 19 are two diametrically opposed concave plates 40 composed of metallic material or heat resisting glass. These plates conform to the curvature of the wall of valve chamber 12 and closely confine resilient inserts 41 between ribs 36 and the wall of the valve chamber. The resilient inserts 38 and 41 are provided with outwardly flared vertical tongue portions 42 which perform a wiping action on the surface of valve plug 19 to provide an airtight seal between the valve body and plug.

Resting horizontally against the bottom and top surfaces of resilient inserts 38 and 41 and ribs 36 are a pair of rigid rings or gaskets 43. These gaskets are held from contact with plates 40 and flanges 39 of the tubular inserts by resilient inserts and ribs 36 so that pliable friction therebetween is avoided. Seated against rings 43 are two resilient plug suspension seal rings 44 which are urged into contact with rings 43 by annular ribs 45 extending from the upper surface of base plate 22 and from the undersurface of valve bonnet 23. Pressure exerted by the base plate and valve bonnet causes compression of the plug suspension seal rings, thus urging them into plug suspension channels 21. The suspension seal rings suspend rotatable valve plug 19 within the valve chamber and provide an airtight seal between the plug and the inner walls of the valve chamber.

Figure 4:
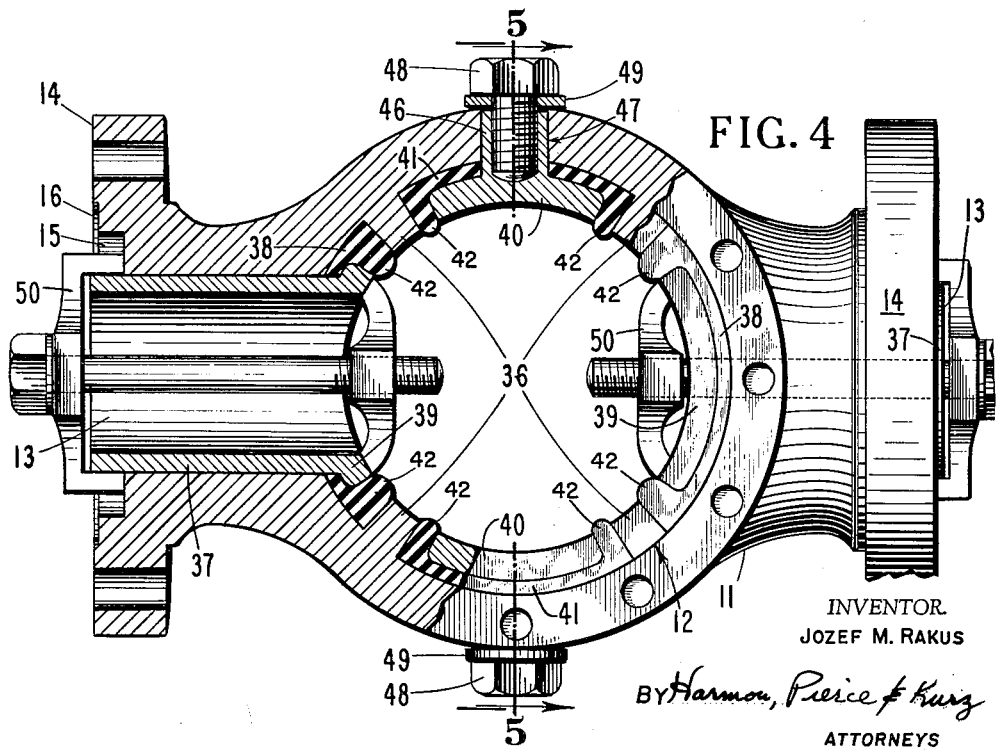
Figure 4 is a plan view partly in horizontal central section of the valve as it appears after the removal of the top and bottom sections, the annular plug suspension structure and the valve plug.
Figure 5:
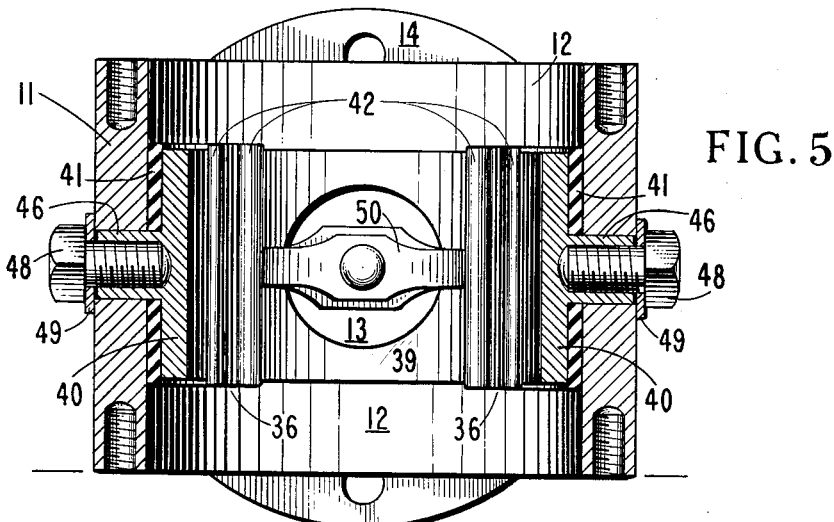
Figure 5 is a sectioned view of the valve in side elevation taken on the line 5—5 of Figure 4.

Referring now to Figures 4 to 6, the tubular port liners 37 and the diametrically opposed plates 40 previously referred to may be inserted into the valve body by means illustrated in Figure 4. The diametrically opposed plates 40 are provided with socket-like internally threaded projections 46 on their convex side (Figure 6), and these projections are accommodated in circular openings 47 formed in the walls of the valve chamber between the vertical ribs 36. A suitable pair of bolts 48 and washers 49 are provided for drawing plates 40 between the ribs 36 and against inserts 41. The valve port liners 37 are forced into the valve inlet and outlet ports against the axial resistance of resilient inserts 38 which are prepositioned in the valve chamber, by means of vise members 50. Subsequently, the valve plug 19 is pressed into the valve chamber causing the compression of insert tongues 42. When the plug is injected to a point bordering vises 50, the vises and the bolts 48 are removed and the resilient inserts 38 and 41 will urge plates 40 and valve port liners 37 into resilient contact with the walls of the valve plug. The valve plug is then forced further into the valve chamber until plug passage 20 is aligned with the valve ports 13.

It will be readily apparent to those skilled in the art that the valve plug of the present invention being resiliently suspended in close relationship to the chamber walls is capable of limited movement in all directions within said chamber. The resilient sealing inserts and plug suspension members act to maintain an airtight seal between the plug and the valve body under all conditions and to permit the plug and its attached cap assembly to float freely in response to varying pressure differentials within the fluid system. They also insure the return of the plug to an axially aligned full open position, thus assuring a smooth valve operation in conditions of high fluid pressure.

The selection of appropriate materials for the construction of the present valve assembly permits the prolonged use of the valve without the necessity of maintenance and lubrication. The valve body and member can be constructed of glass, dural plastic, stainless steel, or other suitable corrosion resistant materials. Preferably the valve plug is constructed of a heat resistant glass while the nonresilient members within the valve chamber are of polished stainless steel. The low frictional resistance between glass and polished stainless steel makes it possible for the valve plug to rotate within the valve chamber with unsurpassed ease and a minimum of resistive wear between the contacting surfaces. The resilient seal members constantly wipe and polish the surface of the valve plug, thus effecting a highly polished surface which does not require lubrication.

The invention provides a novel and improved rotary valve assembly of compact size utilizing the described components, the arrangement and types of which may be subject to numerous modifications well within the purview of this inventor who intends only to be limited to a liberal interpretation of the specification and the appended claims.

I claim:

1. A rotary valve for high pressure fluid systems comprising a valve body provided with a cylindrical chamber and having inlet and outlet ports for flow of fluid through the chamber, a rotatable ported valve plug positioned within said chamber spaced at all points from the walls of the body, resilient means mounted between said cylindrical chamber and said valve plug to resiliently support said valve plug within said chamber for rotation and limited displacement with respect to the valve body in all directions responsive to fluid pressure variations within the system, and sealing means disposed about said ports within said body between the wall thereof and the plug, said resilient means providing the sole support for said valve plug.

2. A rotary valve for fluid pressure systems comprising a valve body provided with a cylindrical chamber and having inlet and outlet ports for flow of fluid through the chamber, a rotatable ported valve plug positioned within said chamber and being spaced at all points from the interior wall of the chamber, annular resilient plug suspension means horizontally disposed within the chamber between the walls of the body and the plug, said suspension means constituting the sole support for said valve plug and facilitating limited movement of the plug in all directions in response to fluid pressure variations within the system, and resilient sealing means vertically disposed about said ports within said body between the wall thereof and the plug.

3. A rotary valve for fluid pressure systems comprising a valve body provided with a cylindrical chamber and having inlet and outlet ports for flow of fluid through the chamber, a rotatable ported valve plug positioned within said chamber and being spaced at all points from the interior wall of the chamber, resilient annular plug suspension means horizontally disposed within the chamber between the walls of the body and the plug to provide an annular airtight seal between the plug and the body while permitting rotation of the plug relative to the body, said suspension means constituting the sole support for said plug and facilitating limited movement of the plug in all directions in response to fluid pressure variations within the system, and resilient sealing means vertically disposed about said ports within said body between the wall thereof and the plug, said sealing means being in wiping engagement with the plug to provide an airtight seal between the plug and the body for all positions of the plug.

4. A rotary valve for fluid pressure systems comprising a valve body provided with a cylindrical chamber and having inlet and outlet ports for flow of fluid through the chamber, resiliently urged shiftable liner members disposed within said ports in sliding relationship thereto, a rotatable ported valve plug positioned within said chamber and being spaced at all points from the interior wall of the chamber, resilient suspension and sealing means secured within the body to engage and resiliently suspend the plug within the chamber for limited displacement with respect to said chamber in all directions, and resilient seal means disposed against the wall of the chamber about the inlet and outlet ports and engaging the liner members to urge said liner members into contact with the plug, said resilient suspension means providing the sole support for the plug.

5. A rotary valve for fluid pressure systems comprising a valve body with a cylindrical chamber and having inlet and outlet ports for flow of fluid through the chamber, resiliently urged shiftable liner members disposed within said ports in sliding relationship thereto, a rotatable ported valve plug positioned within said chamber and being spaced at all point from the interior wall of the chamber, a pair of annular resilient elements secured within the valve body and extending outwardly of the chamber wall to engage the plug, one said element being positioned above the body ports and the other said element being positioned below the body ports, said elements constituting the sole suspension means for suspending the plug in spaced relationship to the chamber walls for limited movement in all directions and sealing the chamber axially of the plug, and sealing means disposed against the wall of the chamber about the inlet and outlet ports and engaging the liner members to urge said liner members into contact with the plug.

6. A rotary valve for fluid pressure systems comprising a valve body provided with a cylindrical chamber and having inlet and outlet ports for flow of fluid through the chamber, a liner member slidably positioned within each port, a resilient seal disposed against the wall of the chamber about each valve port and engaging a liner member to urge the same inwardly of the chamber, a rotatable ported plug assembly partially positioned within the chamber and having an actuation portion thereof extending outwardly of the chamber and the valve body, said plug assembly being spaced at all points from the body, and resilient suspension and sealing means secured within the body and engaging the plug assembly to resiliently suspend the assembly in spaced relationship to the body to permit limited displacement of said plug in all directions, said resilient suspension means being the sole support means for said plug.

7. A valve for fluid pressure systems comprising a valve body having a valve chamber with inlet and outlet ports, resiliently urged shiftable liner members disposed within said ports in sliding relationship thereto, said liner members being composed of stainless steel, a valve plug composed of heat resistant glass positioned within said chamber and spaced at all points from the walls of the chamber and being in wiping engagement with said liner members, resilient means mounted between the walls of said chamber and said valve plug to support said valve plug for limited displacement with respect to the valve body in all directions, and sealing means disposed about said ports within said body between the wall thereof and the plug, said resilient means being the sole support for the valve plug.

8. A valve for fluid pressure systems comprising a valve body having a valve chamber and having inlet and outlet ports, a valve plug positioned within the said chamber and spaced at all points from the walls of the chamber, resilient means mounted between walls of said chamber and said valve plug to support said valve plug for limited displacement with respect to the valve body in all directions, and sealing means disposed about said ports within said body between the walls thereof and the plug, said resilient means being the sole support for the valve plug.

9. A rotary valve for pressure fluid systems comprising a valve body provided with a cylindrical chamber having inlet and outlet ports, a rotatable ported plug assembly partially positioned within the chamber and having an actuation portion thereof extending outwardly of the chamber and the valve body at one end thereof, said plug assembly being spaced at all points from contact with the valve body, shiftable tubular liner members disposed within said ports and provided with annular flanges which extend into the valve body to engage the cylindrical surface of said valve plug, resilient means surrounding said liner members and located about the outer periphery of the flanges and between the flange portions thereof and the valve body to resiliently urge said tubular members into wiping engagement with the valve plug, and annular resilient support means mounted within said valve chamber and disposed in surrounding, sealing and supporting relationship with said valve plug to support said plug within said chamber while permitting rotation and displacement of said plug with respect to said chamber to the limit of its spaced relation with said chamber, said annular resilient support means comprising the sole support for said valve plug within said chamber.

References Cited in the file of this patent

UNITED STATES PATENTS

| | | |
|---|---|---|
| 2,210,335 | Mueller | Aug. 6, 1940 |
| 2,485,915 | Parker | Oct. 25, 1949 |
| 2,613,057 | Snyder | Oct. 7, 1952 |
| 2,694,548 | Stekoll | Nov. 16, 1954 |
| 2,890,017 | Shafer | June 9, 1959 |
| 2,911,009 | Parker | Nov. 3, 1959 |

FOREIGN PATENTS

| | | |
|---|---|---|
| 2,574 | Great Britain | Feb. 18, 1887 |